Feb. 26, 1963 S. WALD 3,079,598

ANALOG-TO-DIGITAL CONVERTER

Filed Feb. 21, 1961 4 Sheets-Sheet 1

INVENTOR.
SIDNEY WALD.
BY

INVENTOR.
BY SIDNEY WALD.
Carl V. Olson

Feb. 26, 1963 S. WALD 3,079,598

ANALOG-TO-DIGITAL CONVERTER

Filed Feb. 21, 1961 4 Sheets-Sheet 3

INVENTOR.
SIDNEY WALD.
BY
Carl V. Olson

INVENTOR.
SIDNEY WALD
BY
Carl V. Olson
ATTORNEY.

3,079,598

ANALOG-TO-DIGITAL CONVERTER

Sidney Wald, Merchantville, N.J., assignor to Radio Corporation of America, a corporation of Delaware Filed Feb. 21, 1961, Ser. No. 90,747
12 Claims. (Cl. 340—347)

This invention relates to analog-to-digital converters by means of which an analog signal can be translated to an equivalent digital signal such as a binary digital signal.

It is the general object of this invention to provide an improved analog-to-digital converter which is relatively simple, compact, stable and reliable.

It is another object of the invention to provide an improved analog-to-digital converter including a single magnetic core by means of which an analog signal is compared with progressively different bias signals.

In one aspect, the invention comprises a magnetic core having an analog winding thereon for receiving an analog input signal and producing an analog magnetomotive force in the core. The core is also provided with the sequence of bias windings corresponding with a sequence of digits to be represented in the output signal. Means are provided to sequentially apply bias currents to the bias windings to produce respective different values of bias magnetomotive force in a direction opposite to that produced by the analog signal. The relative values of the analog magnetomotive force and the first-applied bias magnetomotive force determines whether or not the magnetization in the core is saturated in one direction or saturated in the opposite direction. A read-out drive pulse produces a force in the same direction as the analog signal. A sense circuit coupled to the core senses whether or not the first read-out drive pulse caused a switch in magnetization to occur, provides the first digit of a digital output signal, and conditionally causes removal of the applied bias current. Then, in like manner, the second bias winding is energized, another read-out drive pulse is applied and the sense circuit senses the relative magnitudes of the analog force and the new bias force to provide the second digit of the digital output signal and to cause conditional removal of the second-applied bias. The process repeats until all the digits of the output signal are produced, and then the system is reset and is ready to convert the next following value of analog signal to a corresponding digital signal.

These and other objects and aspects of the invention will be apparent to those skilled in the art from the following more detailed description taken in conjunction with the appended drawings wherein.

Figure 1:
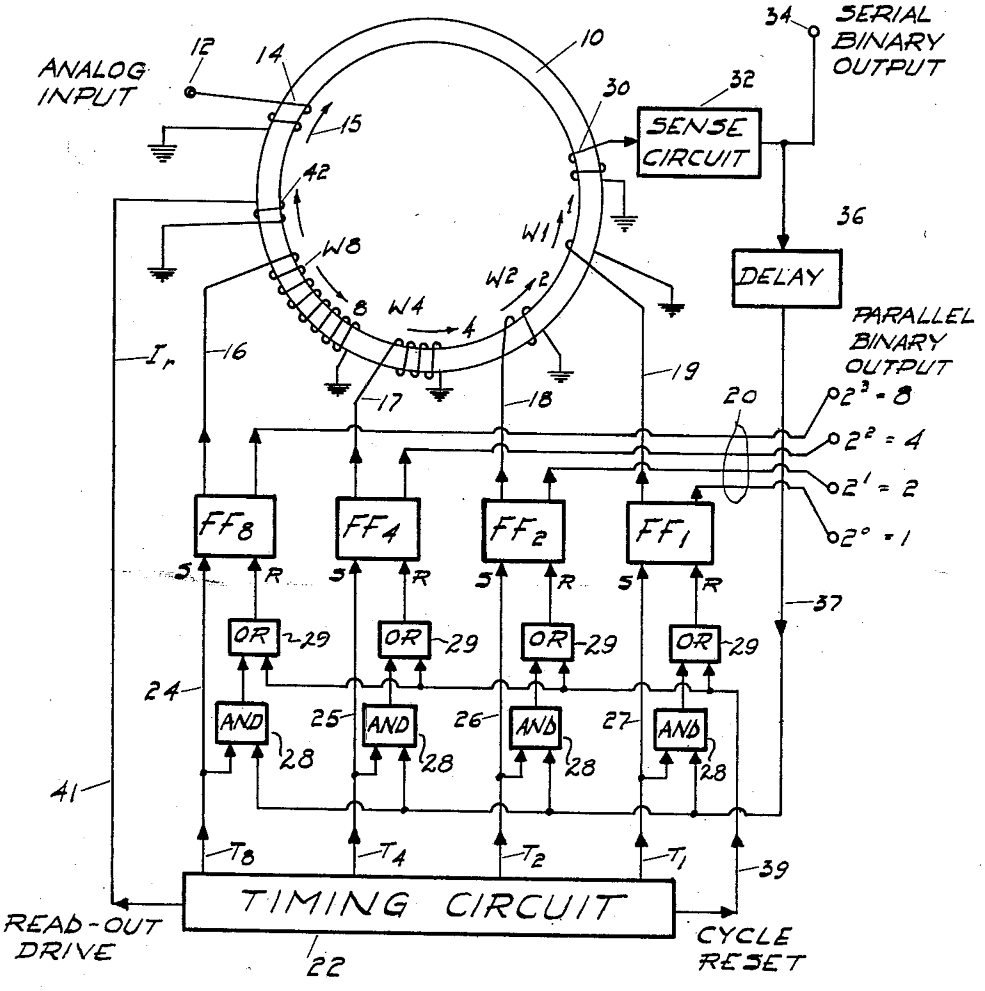
FIGURE 1 is a diagram of an analog-to-digital converter system according to the invention.

FIGURE 1 shows an analog-to-binary digital converter suitable for translating an analog input signal to a binary digital signal having four digits. It will be understood that the system of FIGURE 1 is illustrative of the invention, and that the invention is equally applicable to systems providing an output having more than or less than four digits. The system of FIGURE 1 employs a single magnetic core 10 having a relative square hysteresis loop characteristic. An analog input signal terminal 12 is connected to an analog winding 14 on the core 10. The direction of analog magnetomotive force produced in the core by the winding 14 has an arbitrary direction represented by the arrow 15.

The core 10 is provided with four bias windings designated $W_8$, $W_4$, $W_2$ and $W_1$, these designations being such as to reflect the relationship between the windings and the four digits of the output binary signal. The bias windings produce respective magnetomotive forces in a direction opposite to that of the analog winding 14. The first bias winding $W_8$, produces a magnetomotive force of eight units, the bias winding $W_4$ produces a magnetomotive force of four units, the bias winding $W_2$ produces a magnetomotive force of two units and the bias winding $W_1$ produces a magnetomotive force of one unit. The progressively lower magnetomotive forces produced by the bias windings preferably result from the illustrated construction wherein the bias windings have progressively fewer turns, (each being one-half the preceding one), and wherein equal amplitude currents are supplied to the windings. The same result can be achieved by constructing all the bias windings with the same number of turns, and then applying similarly graded different bias currents to the respective bias windings.

Flip-flop multivibrator and current switch circuits $FF_8$, $FF_4$, $FF_2$ and $FF_1$ have outputs connected to respective ones of the bias windings $W_8$, $W_4$, $W_2$ and $W_1$ over leads 16, 17, 18 and 19, respectively. The flip-flop circuits have respective outputs 20 connected to binary signal output terminals $2^3$, $2^2$, $2^1$ and $2^0$. The flip-flop circuits are each provided with set and reset input terminals designated S and R. The flip-flop multivibrator and current switch circuits $FF_8$ through $FF_1$ may be constituted by any suitable known circuit such as the one illustrated in FIGURE 4. A timing circuit 22 sequentially applies pulses to the set inputs S of the flip-flop circuits over leads 24, 25, 26 and 27. The timing circuit 22 also sequentially applies pulses to the reset inputs R of the respective flip-flop circuits through respective "and" gates 28 and "or" gates 29.

A sense winding 30 on the core 10 is connected to a sense circuit 32 having an output applied both to a serial binary signal output terminal 34, and also through a delay 36 and a lead 37 to all of the "and" gates 28. The sense circuit 32 may be any suitable known circuit such as the one illustrated in FIGURE 5. The timing circuit 22 has a cycle reset output applied over lead 39 to all of the "or" gates 29. The timing circuit 22 also has a read-out drive output applied over lead 41 to a read-out drive winding 42. The system of FIGURE 1 is operative without the read-out drive winding, but a mode of operation employing the read-out winding is preferred because it provides a strong digital output signal under all circumstances.

The operation of the analog-to-digital converter system of FIGURE 1 will now be described by describing the operation of the system, when an analog input signal of ten units is applied to the analog input terminal 12, and when this is followed by an analog input signal of two units. The input analog signal is represented by the wave *a* of FIGURE 2. If the analog input signal varies considerably in the interval of one cycle of operation of the converter, the analog input signal should be one which is sampled and maintained at a constant value during one cycle of operation of the converter. Assume that the analog signal magnetizes the core in the positive direction of saturation.

Figure 2:
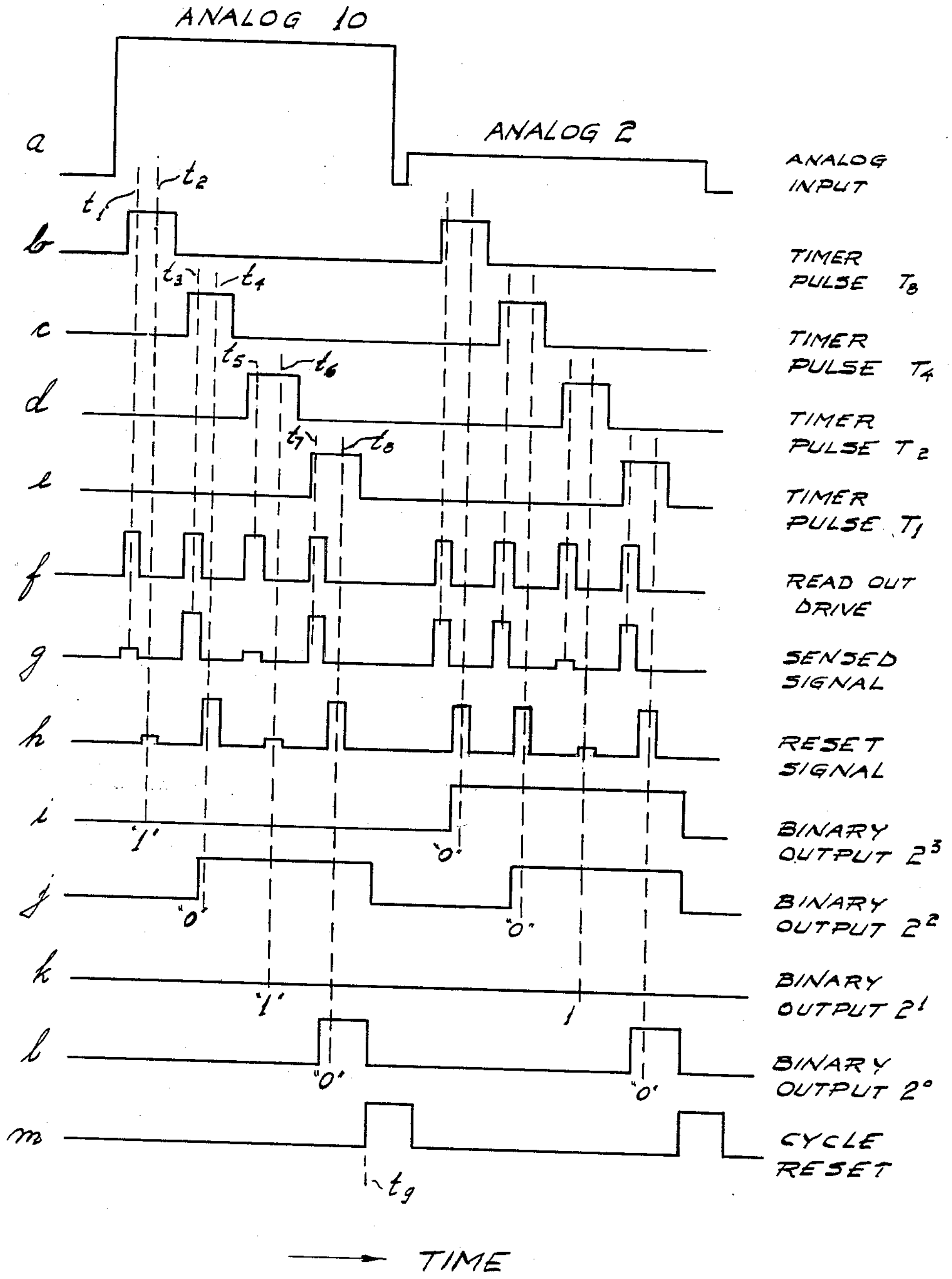
FIGURE 2 is a series of signal waveforms which will be referred to in describing the operation of the system of FIGURE 1.
Figure 3:
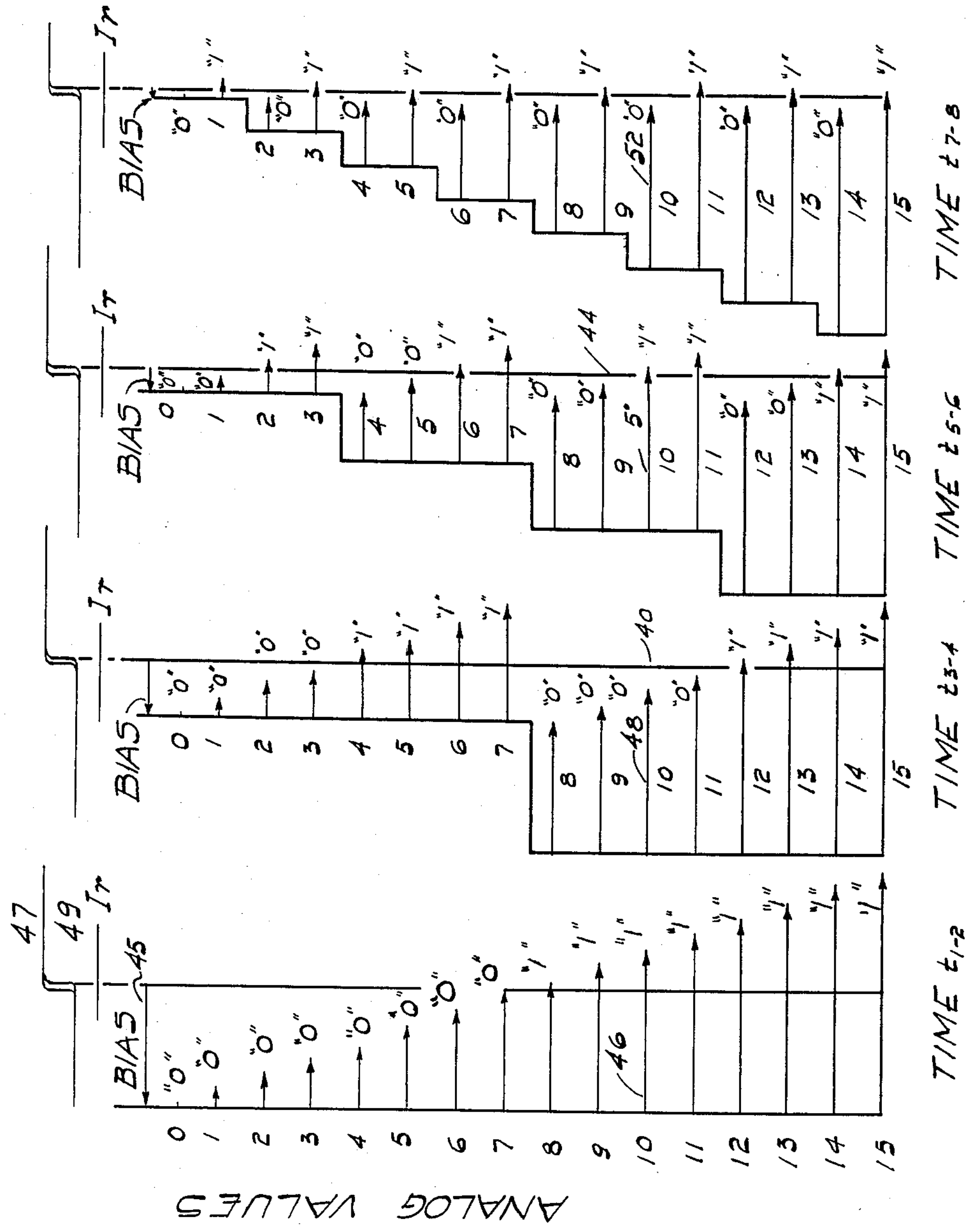
FIGURE 3 is a representation of fifteen different analog signal amplitude magnetomotive forces and bias magnetomotive forces existing at four different time periods in the sequence of operation of the system of FIGURE 1.

The timing circuit 22 supplies timing pulses sequentially to the set inputs S of the flip-flop circuits $FF_8$ through $FF_1$, the sequential waveforms being as represented by the waves *b, c, d* and e of FIGURE 2. The timer pulses cause the flip-flop circuits to assume their set states during which they supply bias currents to their respective bias windings. At time $t_1$ in FIGURE 2, the timer pulse $T_8$ has triggered circuit $FF_8$ to its set condition so that it is supplying bias current to the bias winding $W_8$. The bias winding $W_8$ produces a counterclockwise magnetomotive force of eight units in the core 10 in a direction to magnetize the core in the negative direction of saturation. A net positive force of two units is thus applied to the core 10. This condition is illustrated in FIGURE 3 by the bias arrow 45 and the analog arrow 46. The resultant magnetomotive force extends to the right-hand side of the threshold provided by the hysteresis loop characteristic 47 and the core is in the positive direction of saturation. The sense circuit 32 does not respond to any output produced by the analog input signal, for reasons described hereinafter.

Then, the timing circuit 22 delivers a read-out drive pulse, as represented by the waveform *f* in FIGURE 2, to the drive winding 42. The direction of the magnetomotive force caused by the drive current $I_r$ is as represented by the arrow 49 in FIGURE 3, and is in the same direction as the analog magnetomotive force 46. Therefore, the drive magnetomotive force drives the magnetization in the core further into saturation in the positive direction. Therefore, there is no appreciable flux change in the core and consequently there is no signal picked up by the sense winding 30 and applied to the sense circuit 32. The absence of an output from the sense winding at the output terminal 34 during the read-out pulse indicates (by arbitrary convention) that the first digit of the output binary signal is a "1."

The flip-flop circuit $FF_8$ continues to supply bias current to the bias winding $W_8$ and at time $t_3$ in the chart of FIGURE 2, a timer pulse $T_4$ is supplied to the flip-flop circuit $FF_4$ so that it supplies a current to bias winding $W_4$. The bias winding $W_8$ and $W_4$ now supply a total of twelve units of bias magnetomotive force to the core 10. This is more than the analog magnetomotive force of ten units as represented by the arrow 48 in FIGURE 3. The bias current then changes the core from the positive to the negative direction of saturation. The core output signal applied to the sense circuit 32 is of improper polarity, say positive, to cause a sense circuit output. Therefore, at the later time $t_3$ when the next read-out drive pulse is applied, the core 10 is switched over the threshold 40 from the negative to the positive direction of saturation. This results in relatively large core output pulse of negative polarity which is applied to the sense circuit 32. The sense circuit 32 applies a pulse to the digit output terminal 34 to represent the second digit as a "0." The sensed output signal at time $t_3$ is represented by the waveform *g* in FIGURE 2.

The sensed signal is delayed by the delay 36 and is applied over lead 37 as a reset signal (wave *h* of FIGURE 2) to all of the "and" gates AND. At time $t_4$, the reset signal pulse can be seen in FIGURE 2 to coincide with the timer pulse $T_4$. The result is that the "and" gate AND transmits a reset signal through the "or" gate OR to the reset input R of the flip-flop circuit $FF_4$. The flip-flop circuit is thus reset so that it no longer supplies bias current to the bias winding $W_4$. The analog input signal then returns the core to the positive direction of saturation.

At time $t_5$, the timing circuit 22 supplies a timer pulse $T_2$ to the flip-flop circuit $FF_2$ with the result that a bias magnetomotive force of two units is imparted to the core 10 by the bias winding $W_2$. There now is a total bias magnetomotive force in the core of eight units plus two units or ten units. This condition is represented by the arrow 50 in FIGURE 3. The analog magnetomotive force 50 just balances the bias magnetomotive force so that when the read-out magnetomotive force due to current $I_r$ is applied, the core 10 merely becomes further magnetized in the positive direction. Thus, there is no appreciable output pulse applied to the sense circuit 32, and the absence of a pulse at the digital output terminal 32 indicates that the third binary digit is a "1."

At time $t_7$, the timing circuit 22 supplies a timer pulse $T_1$ to the flip-flop circuit $FF_1$ causing one unit of magnetomotive force to be delivered to the core by the bias winding $W_1$. The total bias magnetomotive force is now eight units plus two units plus one unit, or eleven units. This condition is represented in FIGURE 3 by the arrow 52. The net bias current charges the core from the positive to the negative direction of saturation. The following read-out drive current $I_r$ changes the core from the negative to the positive direction of saturation. This results in a relatively large pulse applied to the sense circuit 32 and a pulse being delivered to the digital output terminal 34 to represent that the last digit is a "1." Thus the digital output is 1010=10.

The timing circuit 22 then supplies a cycle reset pulse, wave *n* of FIGURE 2, which goes through all of the "or" gates 29 to the reset inputs R of all of the flip-flop circuits. This removes all of the bias currents from the bias windings and conditions the converter to convert the next following analog signal to its digital equivalent. FIGURE 2 shows th sequence of the operation when the next analog signal has a value equal to two units.

The system of FIGURE 1 has been described as providing a digital output at output terminal 34 with the digits appearing in serial order on a single lead. Binary output level signals are also available simultaneously on separate leads at the parallel output terminals $2^3$, $2^2$, $2^1$ and $2^0$. These outputs are derived from the flip-flop circuits $FF_8$ through $FF_1$ and are signals having waveforms as represented by curves *i* through *l* in FIGURE 2. It will be seen that at time $t_8$, the four binary digits, corresponding to the analog signal time, are simultaneously available at the parallel output terminals $2^3$ through $2^0$.

Figure 4:
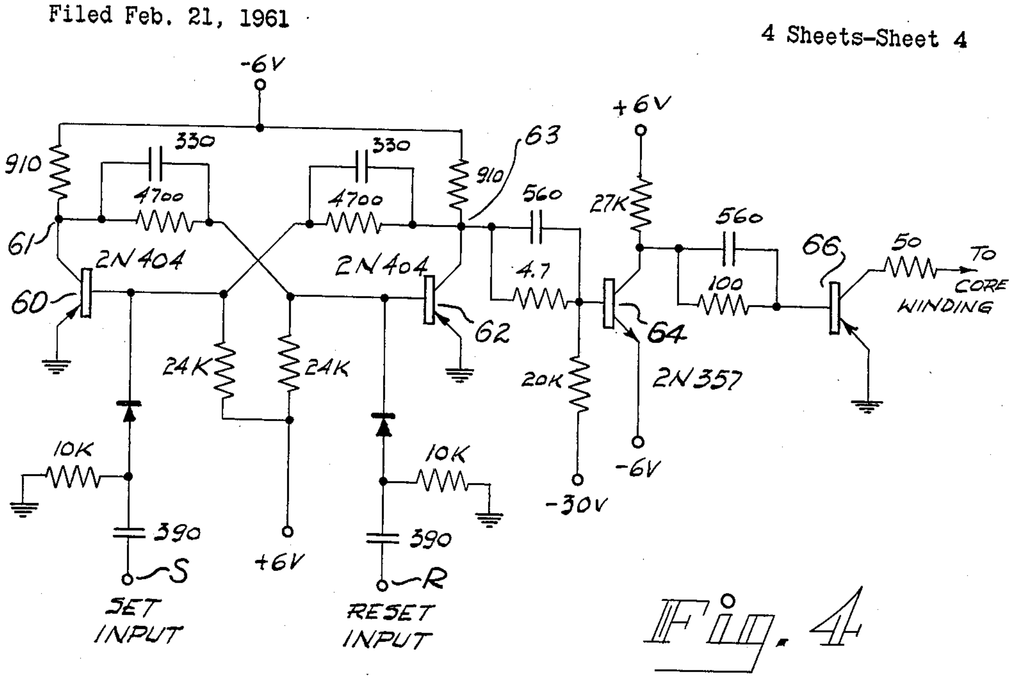
FIGURE 4 is a circuit diagram of a flip-flop multivibrator and current switch which may be employed in the system of FIGURE 1.

FIGURE 4 shows an example of a known circuit which may be employed in the boxes $FF_8$, $FF_4$, $FF_2$ and $FF_1$ in the system of FIGURE 1. The circuit of FIGURE 4 includes two transistors 60 and 62 connected to form a flip-flop or bistable multivibrator having a set input terminal S and a reset input terminal R. An output at point 62 from the collector electrode of transistor 62 is applied through amplifying transistor 64 and 66 to a corresponding one of the core windings $W_8$, $W_4$, $W_2$ or $W_1$ in the system of FIGURE 1. If a parallel binary from the flip-flop is desired, it may be taken from point 62 or point 61, depending on which signal polarity is preferred.

Figure 5:
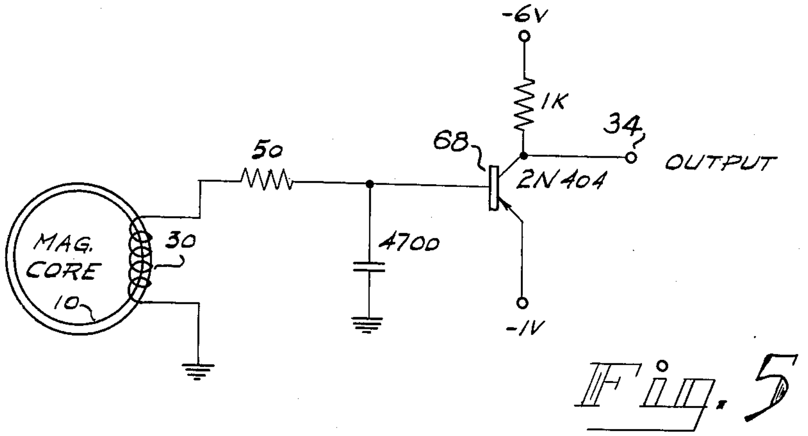
FIGURE 5 is a circuit diagram of a sense circuit which may be employed in the system of FIGURE 1.

FIGURE 5 shows an example of a sense circuit which may be substituted into the block 32 in the system of FIGURE 1. The circuit includes a PNP transistor 68 arranged with regard to the sense winding 30 on core 10 to respond solely to switching of the magnetic flux in core 10 from saturation in one direction to saturation in the opposite direction, and to not respond to switches in the reverse direction. The polarities are selected so that the sense circuit provides an output solely when the application of the read-out drive pulse causes a switching of the magnetization in the core.

What is claimed is:

1. An analog-to-digital converter comprising a magnetic core, an analog winding on said core for receiving an analog input signal and producing an analog magnetomotive force in said core, a sequence of bias windings on said core corresponding with a sequence of digits to be represented in the output signal, means to sequentially apply bias currents to said bias windings to produce respective different values of bias magnetomotive force in a direction opposite to that produced by the analog signal, means to sequentially sense the relative magnitudes of the magnetomotive force produced by the current in each bias winding and the magnetomotive force produced by the analog signal to provide one digit of an output signal and to conditionally interrupt the bias current to the bias winding.

2. An analog to binary converter comprising a magnetic core, an analog winding on said core for receiving an analog input signal and producing an analog magnetomotive force in said core, a sequence of bias windings on said core corresponding with a sequence of binary digits to be represented in the output signal, each of said bias windings in the sequence having substantially half as many turns as the preceding bias winding, means to sequentially apply equal bias currents to said bias windings to produce successively lower respective values of bias magnetomotive force in a direction opposite to that produced by the analog signal, means to sequentially sense the relative magnitudes of the magnetomotive force produced by the current in each bias winding and the magnetomotive force produced by the analog signal to provide one binary digit of an output signal and to conditionally interrupt the bias current to the bias winding.

3. An analog-to-digital converter comprising a magnetic core, an analog winding on said core for receiving an analog input signal and producing an analog magnetomotive force in said core, a sequence of bias windings on said core corresponding with a sequence of digits to be represented in the output signal, means to sequentially apply bias currents to said bias windings to produce respective different values of bias magnetomotive force in a direction opposite to that produced by the analog signal, a read-out drive winding on said core, means to apply a read-out drive current to said drive winding concurrently with the application of bias current to each of the bias windings, whereby said drive current may cause the magnetization in said core to switch between the one and opposite directions of saturation depending on the relative magnitudes of the analog and bias magnetomotive forces, means to sense a change from said opposite to said one directions of saturation to provide one digit of said output signal and to conditionally interrupt the bias current to the bias winding.

4. An analog-to-binary converter comprising a magnetic core, an analog winding on said core for receiving an analog input signal and producing an analog magnetomotive force in said core, a sequence of bias windings on said core corresponding with a sequence of binary digits to be represented in the output signal, each of said bias windings in the sequence having substantially half as many turns as the preceding bias winding, means to sequentially apply equal bias currents to said bias windings to produce successively lower respective values of bias magnetomotive force in a direction opposite to that produced by the analog signal, a read-out drive winding on said core, means to apply a read-out drive current to said drive winding concurrently with the application of bias current to each of the bias windings, whereby said drive current may cause the magnetization in said core to switch from a state of saturation in one direction to a state of saturation in the opposite direction depending on the relative magnitudes of the analog and bias magnetomotive forces, means to sense said switch in magnetization to provide one binary digit of an output signal and to conditionally interrupt the bias current to the bias winding.

5. An analog-to-digital converter comprising a single core, an analog winding on said core for receiving an analog input signal, a number of bias windings on said core equal to the desired number of digits in the output signal, means to sequentially apply bias currents to said bias windings to produce flux in a direction opposite to that produced by the analog signal, sense means to sequentially sense the relative magnitudes of the flux produced by the current in each bias winding and the flux produced by the analog signal to provide one digit of said output signal and means coupled to said sense means to conditionally interrupt the bias current to the respective bias winding.

6. An analog-to-digital converter comprising a magnetic core, an analog winding on said core for receiving an analog input signal and producing an analog magnetomotive force in said core, a number of bias windings on said core equal to the desired number of digits in the output signal, said bias windings being in a sequence, a plurality of bistable circuit means to apply bias currents in sequence to respective ones of said bias windings to produce respective bias magnetomotive forces equal and opposite to progressively different values of analog magnetomotive force, a sense winding on said core, means to apply a read-out drive current to said drive winding concurrently with each of said bias currents to produce a magnetomotive force in the same direction as said analog magnetomotive force, whereby the magnetization of said core is switched from a state of saturation in one direction to a state of saturation in the other direction depending on the relative magnitudes of the analog magnetomotive force and the bias magnetomotive force, and a sense circuit connected to said sense winding to sense whether there is a switch in magnetization and to provide an output for conditionally resetting the corresponding bistable circuit means, whereby digital output signals are available from said bistable circuit means and from said sense circuit.

7. An analog-to-digital converter comprising a magnetic core, an analog winding on said core for receiving an analog input signal and producing an analog magnetomotive force in said core, a number of bias windings on said core equal to the desired number of digits in the output signal, said bias windings being in a sequence with each winding following the first having half as many turns as the preceding one, a plurality of bistable circuit means to apply bias currents to respective ones of said bias windings in sequence to produce bias magnetomotive forces in a direction opposite the direction of the analog magnetomotive force, a sense winding on said core, whereby the magnetization of said core is switched from a state of saturation in one direction to a state of saturation in the other direction when the analog magnetomotive force is less than the bias magnetomotive force, a sense circuit connected to said sense winding to sense whether there is a switch in magnetization and to provide an output for conditionally resetting the corresponding bistable circuit means, whereby digital output signals are available from said bistable circuit means and from said sense circuit, and means to reset all of said bistable circuit means after a cycle of operation.

8. An analog-to-digital converter comprising a magnetic core, an analog winding on said core for receiving an analog input signal and producing an analog magnetomotive force in said core, a number of bias windings on said core equal to the desired number of digits in the output signal, a plurality of bistable circuit means to apply bias currents in sequence to respective ones of said bias windings to produce respective bias magnetomotive forces equal and opposite to progressively different lower values of analog magnetomotive force, a read-out drive winding and a sense winding on said core, means to supply a read-out drive current to said drive winding concurrently with each of said bias currents to produce a magnetomotive force in the same direction as said analog magnetomotive force, whereby the magnetization of said core is switched from a state of saturation in one direction to a state of saturation in the other direction when the analog magnetomotive force is less than the bias magnetomative force, a sense circuit connected to said sense winding to sense whether there is a switch in magnetization and to provide an output for conditionally resetting the corresponding bistable circuit means, whereby digital output signals are available from said bistable circuit means and from said sense circuit, and means to reset all of said bistable circuit means after a cycle of operation.

9. An analog-to-binary converter comprising a magnetic core, an analog winding on said core for receiving an analog input signal and producing an analog magnetomotive force in said core, a number of bias windings on said core equal to the desired number of binary digits in the output signal, said bias windings being in a sequence with each winding following the first having half as many turns as the preceding one, a plurality of bistable circuit means to apply bias currents to respective ones of said bias windings in sequence to produce bias magnetomotive forces in a direction opposite the direction of the analog magnetomotive force, a read-out drive winding and a sense winding on said core, means to supply a read-out drive current to said drive winding concurrently with each of said bias currents to produce a magnetomotive force in the same direction as said analog magnetomotive force, whereby the magnetization of said core is switched from a state of saturation in one direction to a state of saturation in the other direction when the analog magnetomotive force is less than the bias magnetomotive force, a sense circuit connected to said sense winding to sense whether there is a switch in magnetization and to provide an output for conditionally resetting the corresponding bistable circuit means, whereby binary output signals are available from said bistable circuit means and from said sense circuit, and means to reset all of said bistable circuit means after a cycle of operation.

10. An analog-to-digital converter comprising a magnetic core, a first winding linked to said core in one sense for producing a magnetizing force in accordance with an analog signal, a second winding linked to said core in said one sense for applying a read-out magnetizing force, a plurality of other windings linked to said core in the sense opposite the one sense, an output winding linked to said core, means for applying currents to one of said other windings to produce different magnetizing forces each opposing said analog force, means for applying a signal to said read-out winding, said read-out signal producing an output signal only when said opposite force exceeds said analog force, and means responsive to said output signal for removing said one signal and applying another signal to a different one of said other windings to produce an opposite force of smaller magnitude than that produced by said first signal.

11. The combination of magnetic core, means for establishing an analog magnetomotive force in said core in accordance with the magnitude of an input signal, means to successively establish bias counter magnetomotive forces of different graded magnitudes in said core, whereby the relative magnitude of the analog magnetomotive force and each bias magnetomotive force determines the direction of saturation flux in the core, and means to sense a change in direction of flux in said core.

12. The combination of a magnetic core, means for establishing an analog magnetomotive force in said core in accordance with the magnitude of an input signal, means to successively establish bias counter magnetomotive forces of different graded magnitudes in said core, whereby the relative magnitude of the analog magnetomotive force and each bias magnetomotive force determines the direction of saturation flux in the core, means to sense a change in direction of flux in said core, and means responsive to said last-named sense means and operative following establishment of each bias magnetomotive force in said core to conditionally remove said bias magnetomotive force.

References Cited in the file of this patent

UNITED STATES PATENTS 2,805,408 Hamilton ------------- Sept. 3, 1957